April 22, 1924.
C. L. GULICK
GAS CYLINDER
Filed Aug. 26, 1922
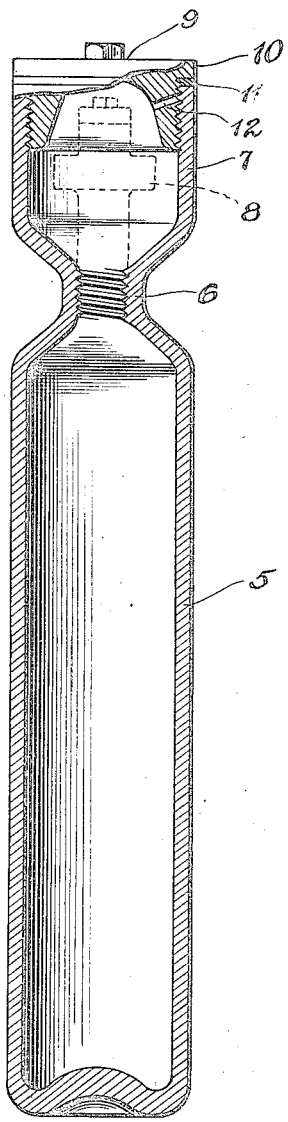
Inventor
Charles L. Gulick
by Jas. T. Richmond
Attorney Patented Apr. 22, 1924.

1,491,764

UNITED STATES PATENT OFFICE.

CHARLES L. GULICK, OF ORANGE, NEW JERSEY, ASSIGNOR TO WILLIAM WHARTON JR. & COMPANY, INCORPORATED, OF EASTON, PENNSYLVANIA, A CORPORATION OF PENNSYLVANIA.

GAS CYLINDER.

Application filed August 26, 1922. Serial No. 584,426.

*To all whom it may concern:*

Be it known that I, CHARLES L. GULICK, a citizen of the United States, residing at Orange, in the county of Essex and State of New Jersey, have invented certain new and useful Improvements in Gas Cylinders, of which the following is a specification.

Cylinders or bottles for the storage, transport, and dispensing of liquids or gases are provided at their neck end with a valve which, in transport, is enclosed within a temporary cap or closure, and which otherwise is not enclosed and is therefore exposed to injury, as for example, when the cylinder is accidentally tilted.

The principal objects of my invention are to provide for housing the valve within the walls of the cylinder so as to protect it from injury and in order to isolate leakage of dangerous gases; and to provide a tell-tale for indicating such leakage.

The nature, characteristic features and scope of the invention will more readily be understood from the following description taken in connection with the accompanying drawing forming a part hereof, and which is a sectional view of a cylinder constructed in accordance with my invention.

According to my invention, I form a cylinder 5, with a constricted or neck portion 6 intermediate the ends thereof, with the upper end 7 continued in the same diameter as the main portion 5, and at any rate of a diameter and length sufficient to completely house the valve 8. The valve 8 is detachably fitted to the neck portion as usual, and when the integral housing portion 7 is closed any leakage from the valve will be confined in the chamber afforded by the housing 7. In order to ensure isolation of such leakage, I prefer to employ a cap or plug 9 which is threaded to engage the internally threaded portion of the housing 7, and which has a sealing flange 10 which cooperates with a gasket 11, and with the end wall of the housing to establish a gas-tight joint. It is desirable in the case of hydrocyanic, ammonia, and other dangerous gases, to have some indication of the presence of leakage so that the necessary precautions may be taken. I accomplish this by providing the cap with a duct or vent passage 12, one end of which is in communication with the leakage space and whereof the other end terminates in the threaded area. Evidently by unscrewing the cap, and with the provisions stated, the presence of leakage may be determined and vented without injurious or fatal consequences.

Having described my invention, I claim:—

1. A seamless drawn metal cylinder having its side walls depressed whereby it is divided into a main gas holding portion and a valve housing portion, and means for sealing the valve housing portion and including a leakage tell-tale provision.

2. A seamless drawn metal cylinder having an annular depression to form a valve seating portion and thence reverting to substantially its maximum diameter to form a housing for the valve mechanism, and temporary sealing means to form with the cylinder a chamber for isolating leakage past the valve, said sealing means having provision for safely venting any leakage.

In testimony whereof I affix my signature.

CHARLES L. GULICK.